United States Patent [19]
Swearingen

[11] 3,993,561
[45] Nov. 23, 1976

[54] FUEL FILTER

[76] Inventor: Edward J. Swearingen, P.O. Box 32622, San Antonio, Tex. 78216

[22] Filed: June 16, 1975

[21] Appl. No.: 587,224

[52] U.S. Cl. .............................. 210/131; 210/446; 210/448; 210/456
[51] Int. Cl.² ........................................ B01D 27/10
[58] Field of Search ......... 137/536; 210/131, 416 F, 210/435, 446, 448, 451, 452, 456; 55/312, 313

[56] References Cited
UNITED STATES PATENTS

| | | | |
|---|---|---|---|
| 1,076,128 | 10/1913 | Kupferle | 210/448 X |
| 2,369,740 | 2/1945 | Johnson et al. | 210/435 |
| 2,699,259 | 1/1955 | Birkemeier | 210/131 |
| 2,918,083 | 12/1959 | Clark et al. | 137/536 X |
| 2,937,754 | 5/1960 | Kasten | 210/131 |
| 3,036,594 | 5/1962 | Salisbury | 137/536 |
| 3,817,380 | 6/1974 | Brown | 210/131 |

FOREIGN PATENTS OR APPLICATIONS

| | | | |
|---|---|---|---|
| 733,853 | 3/1943 | Germany | 55/313 |

Primary Examiner—Thomas G. Wyse
Assistant Examiner—Robert G. Mukai
Attorney, Agent, or Firm—Cox, Smith, Smith, Hale & Guenther Incorporated

[57] ABSTRACT

This invention is a fuel filter for use in a fuel line to remove particles from fuels that are subject to freezing under certain operating conditions. The fuel filter has a screen slideably carried on a piston located in an elongated housing. Fuel enters one end of the housing, strikes the piston and flows outwardly through the screen, around the piston, through holes in a spacer and out the other end of the housing. Upon freezing in the screen the fuel or water particles suspended therein, the pressure of the fuel will move the screen and piston along the axis of the housing to open a by-pass around the screen. When the frozen particles melt or fuel pressure is removed, a spring returns the piston and screen to their normal position. Solid particles previously removed from the fuel before freezing remain trapped in the screen.

5 Claims, 3 Drawing Figures

FUEL FILTER

BACKGROUND OF THE INVENTION

This invention relates to fuel filters and, more particularly, to an in-line fuel filter having a bypass around the filter element upon icing of the fuel filter. Any solid particles previously trapped in the fuel filter prior to icing will remain in the fuel filter upon opening the bypass. The screen is slideably carried by a piston.

For kerosene base fuels commonly used by aircraft there is a problem of water particles suspended in the kerosene fuel freezing as they flow through the screen. Upon icing of the screen, the entire screen and piston moves in the direction of flow thereby uncovering a bypass around the screen while simultaneously retaining all foreign particles previously collected from the fuel inside of the screen area. Upon melting of the ice formed in the screen, normal fuel flow will resume.

BRIEF DESCRIPTION OF THE PRIOR ART

Prior to the present invention many types of filtering systems have been devised to resolve problems of filter clogging due to solid particles trapped therein. Many of these prior art devices are lubrication filters as normally associated with an engine oil. Should the filter element become clogged by solid particles it will move to a different position thereby uncovering alternate passages of flow. A typical such oil filter is shown in Redenbarger et al. (U.S. Pat. No. 3,757,951), a copy of which is enclosed with this application. The filter moves against the spring to uncover alternate flow passages at the inlet. Under icing conditions it is very questionable whether Redenbarger et al would operate properly due to a freezing of the filter to inlet connection 19.

Other types of in-line fuel filters have been developed in the past with Birkemeire (U.S. Pat. No. 2,699,259) being a typical example. In Birkemeire, a copy of which is enclosed for the examiner, fuel flows through an inlet passage and screen that is held in position by a spring. The fuel always flows through the spring and out the outlet passage of the filter. According to the requirements of the Federal Aeronautics Administration, the flow of fuel through a coil is unacceptable because of icing that could occur in the coil itself. Any opening through which a kerosene fuel must flow should have a diameter of at least ¼ inch to insure that the fuel will continue to flow upon the water particles contained therein solidifying.

Another example of an in-line filter can be found in Vokes (U.S. Pat. No. 2,145,535) wherein the liquid being filtered would normally flow through a filter element. When the filter element becomes clogged, the filter pushes against the spring thereby uncovering bypass passages around the filter. The liquid being filtered, after bypassing the filter element, would flow through a coil spring before discharge. While Vokes is described as an oil filter, it would not work as a fuel filter subject to icing because of the sliding surfaces subject to freezing, and the flow of the liquid through a coil spring that is also subject to icing.

Various other types of filter elements have been designed in the past, but do not solve the bypass problems that would occur upon icing for the fuel will not flow through small spaces normally created by coil springs due to possible icing on the spring. Also due to problems of icing, it is necessary to eliminate as much as possible any sliding surfaces that may come in contact causing icing therebetween.

SUMMARY OF THE INVENTION

It is an object of the present invention to provide a fuel filter for removing solid particles from the fuel and providing a bypass around the filter in case of icing forming thereon.

It is still another object of the present invention to provide an in-line fuel filter having a screen with the fuel normally flowing through the screen and out of the filter; but upon icing in the screen, the screen slidably moves in the direction of flow of the fuel to open a bypass route around the screen for fuel flow.

It is another object of the present invention to provide a fuel filter with a bypass flow in case of fuel icing on a screen with no portion of the bypass flow having a cross section diameter of less than ¼ inch.

It is a further object of the present invention to provide a fuel filter having a screen area with solid particles being collected toward one end of the screen so that upon icing of the screen, the screen will move in the direction of fuel flow with the fuel flowing therearound. The previously collected solid particles remain secured against the screen by the frozen water particles.

The fuel filter is an in-line connection that has a rather high volume of flow therethrough with an inlet port being on one end and an outlet port being on the other end thereof. The fuel filter is basically of cylindrical construction with a cylinder type of outer housing. The screen portion is a concentric cylinder inside of the housing with a space separating the screen and the housing. The screen is normally forced against the inlet end around the inlet port by a spring loaded piston on the other end thereof. The spring acts against a spacer having holes therethrough so that the fuel may continue to flow through the holes in the spacer without flowing through the spring in case of icing on the spring itself. As fuel flows through the fuel filter, solid particles tend to collect next to the screen and adjacent to the piston due to the normal high volume of fuel flow. In case of icing in the screen caused by the freezing of water particles in the kerosene based fuel, icing will first occur in the areas where the solid particles are located. As icing continues to form on the entire screen, a pressure differential will exist across the screen thereby causing the screen to push against the piston. As the piston moves it carries the screen away from the inlet end of the housing. This allows fuel to flow around the screen, through the taps of the piston and holes of the spacer, and out the outlet port of the fuel filter. Upon melting of the frozen particles or stopping of the flow of the fuel through the fuel filter, the piston and the screen will return to their normal position.

DESCRIPTION OF THE PREFERRED EMBODIMENT

Figure 1:
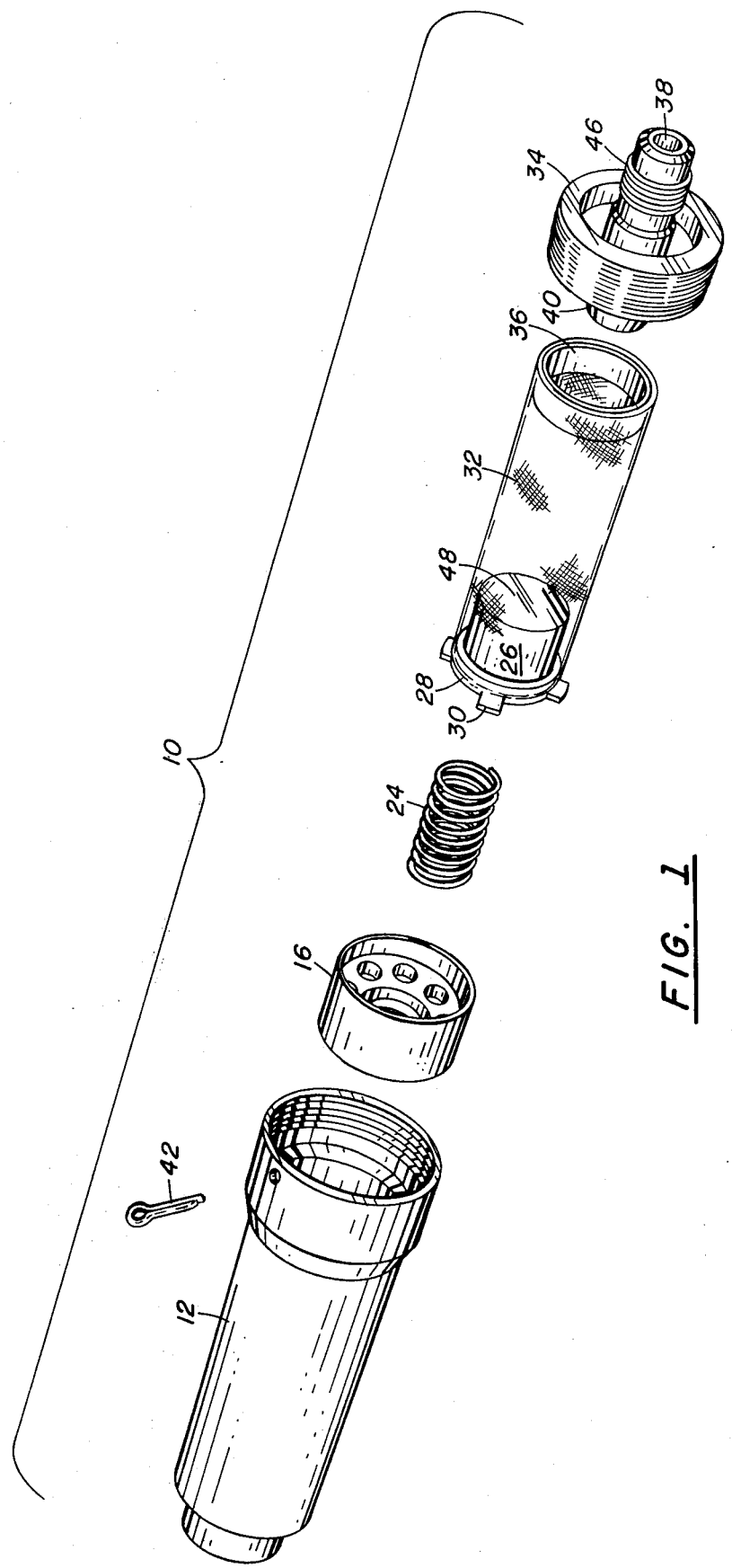
FIG. 1 is an exploded perspective view of the fuel filter.
Figure 2:
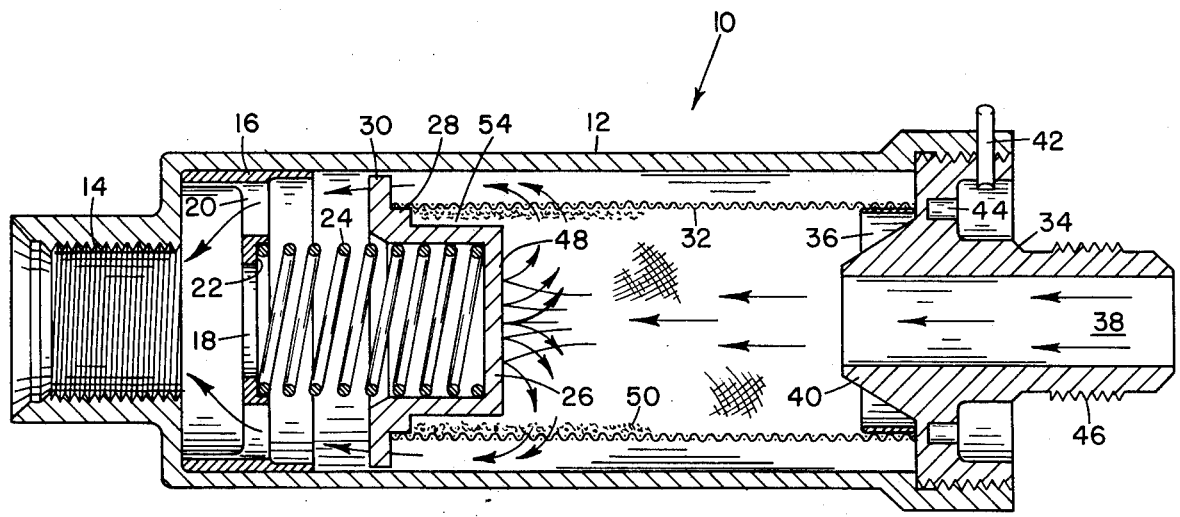
FIG. 2 is a cross sectional view of the fuel filter in its normal position with flow lines indicating normal flow of fuel therethrough.

Referring now to FIG. 2 there is shown a fuel filter represented generally by the reference numeral 10. A cylindrical type housing 12 encloses the fuel filter 10 with threaded outlet 14 connecting to the fuel line (not shown). Inside of the cylindrical type housing 12 is located a spacer 16 having a center hole 18 extending therethrough. Around the center hole 18 is located a plurality of equally spaced holes 20. Also inside of the center hole 18 is located a circular ledge 22 against which one end of spring 24 rests.

The other end of spring 24 rests against the inside cap of piston 26. The base of piston 26 has an outward flange shoulder 28 extending therearound with further outward tabs 30 retaining the piston 26 in its normal position. It should be realized that there is a very loose sliding relationship between tabs 30 and the inside of housing 12.

A cylindrical screen 32 fits snugly around the outward flange shoulder 28 and rests against tabs 30. The opposite end of screen 32 is held against an inlet fitting 34. A metal ring 36 is attached to the end of screen 32 to give it additional strength.

The inlet fitting 34 has an inlet flow passage 38 extending therethrough with the innermost part of the fitting having a tapered section 40 to form the innermost part of the inlet flow passage 38. The inlet fitting 34 is threadably connected to the housing 12 with a pin 42 insuring that the inlet fitting 34 will remain securely in position. Flat bottom holes 44 in the inlet fitting 34 provides a means for screwing the inlet fitting into the housing 12 as well as removal therefrom after removal of the pin 42. The inlet fitting 34 has a threaded connection 46 for connecting to the fuel line (not shown).

METHOD OF OPERATION

The present invention which is designed for a fairly high volume of fuel flow therethrough, and would typically be used for kerosene based fuel normally used in aircraft, is described in the following paragraph.

The fuel would flow into the fuel filter 10 through inlet flow passage 38 in the directions generally indicated by the arrows. Normally fuel flow through the screen 32 will be at the portion of the screen 32 near the piston 26. The righthand surface of the piston 26 repels much of the fuel flow and is hereinafter referred to as target 48. As the fuel flows into the fuel filter 10, it will normally impact the target 48 to be repelled outward through the screen 32. This causes most of the solid particles 50 to accumulate near the piston 26 with a major portion collecting in the space 54 between the piston 26 and screen 32. The continuing flow of the fuel through the screen 32 will maintain the solid particles 50 in that position. After flowing through the screen 32, the fuel flows around tabs 30 of piston 26 and through the holes 18 and 20 of spacer 16. Thereafter the fuel flows out through threaded outlet 14.

Figure 3:
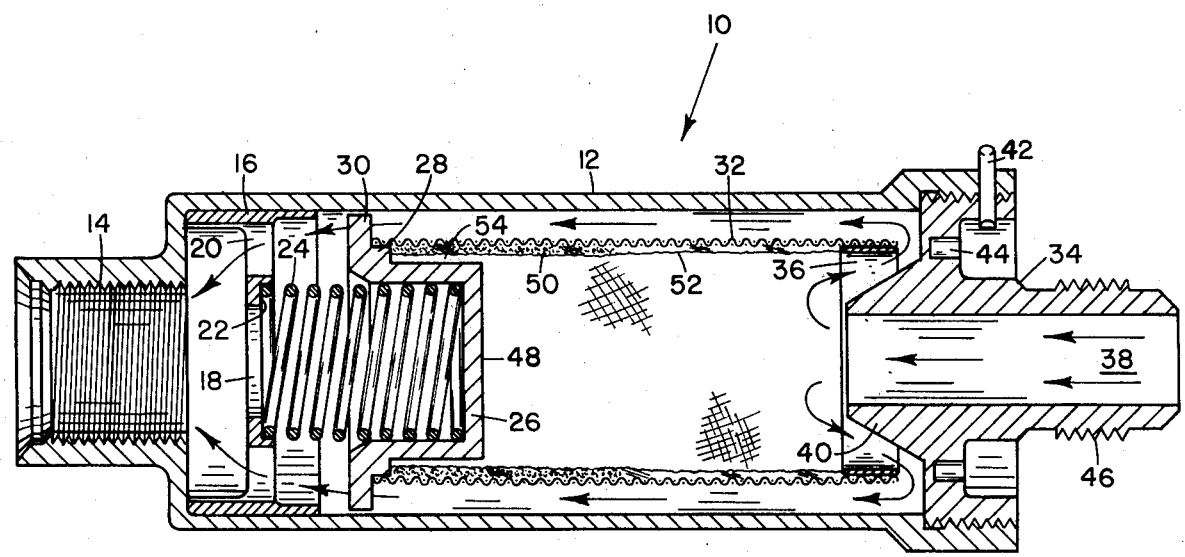
FIG. 3 is a cross sectional view of the fuel filter in a position where icing has occurred on the screen with the flow lines indicating the flow of fuel through the bypass.

As the temperature of the fuel flowing through fuel filter 10 decreases below a point, water particles in the fuel will tend to freeze. Since a kerosene base fuel has water particles suspended therein, any time the kerosene base fuel flows through a filter element there is a tendency for freezing of the water particles during operation under very cold conditions. As the water particles freeze to the screen 32, they will first begin freezing around the solid particles 50 trapped therein. As the portion of the screen 32 connecting to the piston 26 begins to freeze, the flow of the fuel will be diverted through the righthand portion of the screen 32 until flow through the screen 32 is sufficiently impeded by the collection of ice particles 52 thereon. Because pressure being exerted on the fuel continually attempts to force fuel through the screen 32, a pressure differential will be developed thereacross. The pressure differential will push the piston 26 and the screen 32 against the resilient force of spring 24. As the piston 26 and screen 32 pushes against the spring 24, they will both move toward the threaded outlet 14 in the manner as shown in FIG. 3. This movement will uncover a bypass between one end of screen 32 and inlet fitting 34. This allows the fuel to flow in a manner as indicated by the arrows in FIG. 3. Since the collection of particles 50 and foreign matter have accumulated around the inner periphery of the screen 32 in an area remote from the bypass, and the particles 50 will be retained in their position due to a freezing of the water particles. The bypass flow around the screen 32 will not release previously trapped particles 50 from the fuel filter 10. In the present invention it is highly unlikely that any previously accumulated particles 50 will be pulled into the system which is not true for prior inventions.

It should be understood that the principal reason for the bypass function of this filter is to provide continuous fuel flow in the event of icing of the screen, rather than the unlikely event of the filter clogging from excessive accumulation of foreign material. Also during the bypass mode of operation, the foreign particles 50 that have been accumulated previously will be encapsulated by the ice 52 prior to the time that the screen is totally clogged thereby resulting in uncovering the bypass around the screen 32. The target 48 provides the additional function of causing the ice 52 to first accumulate in that portion of the screen 32 where the foreign particles 50 have previously been accumulated.

It is essential in the present invention that the bypass mode of operation provide passages that are large enough to permit the flow of ice crystals therethrough without additional ice forming to block the fuel flow. Prior systems that have a bypass mode of operation allow the fuel to flow through a spring wherein the space between the coils of the spring may be very small. It is possible for ice to accumulate on the coils of the spring causing an additional blockage of fuel flow. Contact between the tabs 30 of the piston 26 and the innermost portion of housing 12 is very minimal to avoid sticking due to ice accumulation.

I claim:
1. A fuel filter having a bypass flow passage in case of fuel icing, comprising:
   a cylindrical housing having an inlet at one end thereof and an outlet at the other end thereof;
   cylindrical screen means concentrically arranged in said cylindrical housing;
   piston means abutting a first end of screen means, a second end of said screen means circumscribing said inlet, said piston means including outward extensions to maintain said piston means and screen means substantially along a center axis of said housing, said piston means being generally cup shaped with said screen means circumscribing said cup shape and abutting said outward extensions, the bottom of said cup shape being a target area for directing fuel through said screen means;

spring means forcing said piston means against said screen means;

spacer means between said piston means and said outlet, said spacer means counteracting the force of said spring means and having passages therethrough for allowing flow around said spring means and out said outlet, said spring means being located between said piston means and said spacer means with said passages of said spacer means being located around said spring means to prevent freeze up in said spring means.

2. The fuel filter as recited in claim 1 wherein said inlet includes an inward extension to maintain said screen means in a circumscribing relationship if said screen means becomes covered with ice to cause movement of said screen means and piston means against said spring means.

3. The fuel filter as recited in claim 2 further includes a ring attached to one end of said screen means for strength.

4. The fuel filter as recited in claim 3 wherein said inlet includes a fitting threadably connected to said housing with said screen means abutting thereagainst.

5. The fuel filter as recited in claim 1 being an in-line filter with connection for fuel lines being at said inlet and outlet.

* * * * *